May 28, 1957 J. T. REPKE 2,793,663
CABLE REEL LAGGING MACHINE
Filed Oct. 20, 1954 3 Sheets-Sheet 1
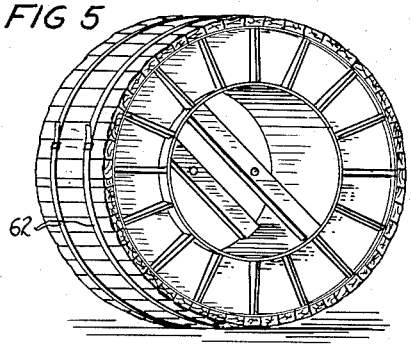
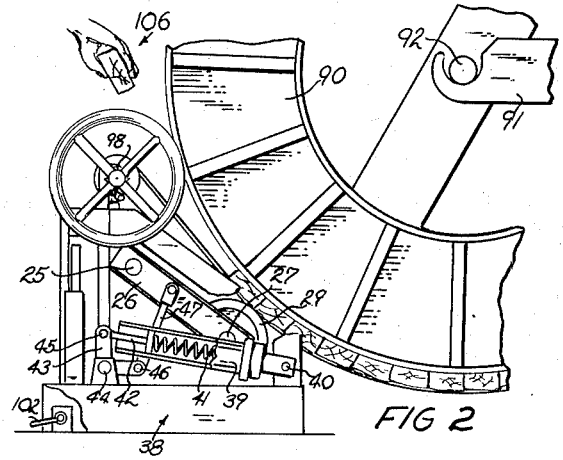
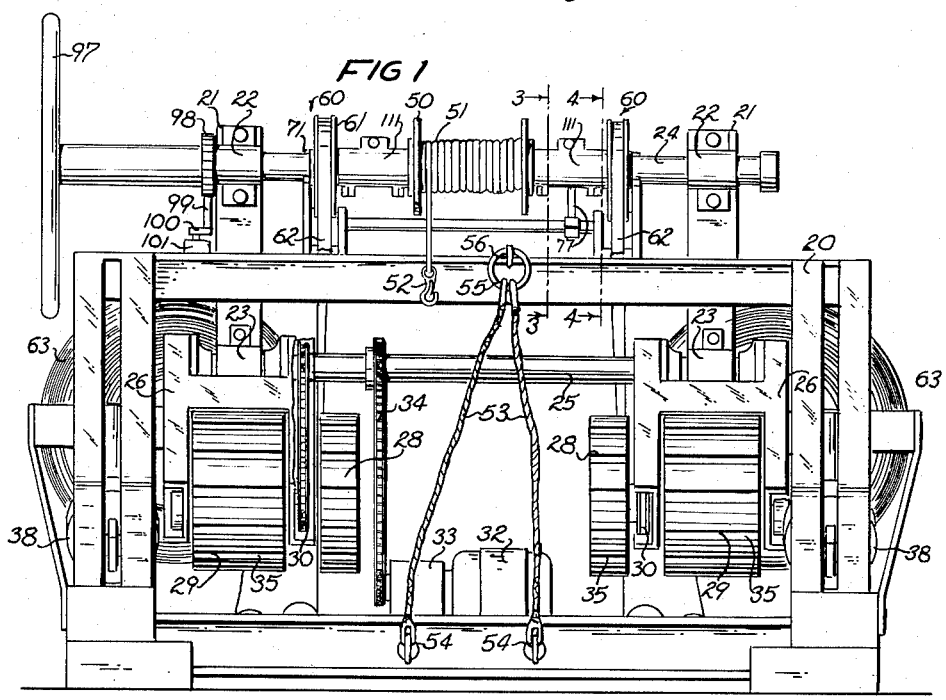
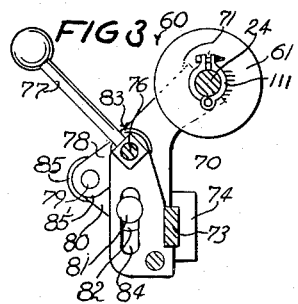
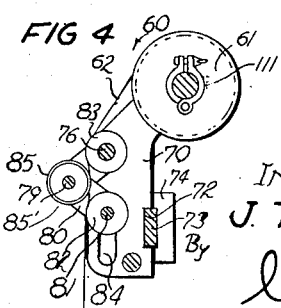
INVENTOR
J. T. REPKE
By W. C. Parnell
ATTORNEY May 28, 1957  J. T. REPKE  2,793,663
CABLE REEL LAGGING MACHINE
Filed Oct. 20, 1954  3 Sheets-Sheet 2

INVENTOR
J. T. REPKE
By W.C. Parnell
ATTORNEY

May 28, 1957  J. T. REPKE  2,793,663
CABLE REEL LAGGING MACHINE
Filed Oct. 20, 1954  3 Sheets-Sheet 3

INVENTOR
J. T. REPKE
By W. C. Parnell
ATTORNEY

United States Patent Office 2,793,663
Patented May 28, 1957

2,793,663

CABLE REEL LAGGING MACHINE

John T. Repke, Brooklyn, N. Y., assignor to Western Electric Company, Incorporated, New York, N. Y., a corporation of New York Application October 20, 1954, Serial No. 463,536

7 Claims. (Cl. 144—25)

This invention relates to reel lagging machines particularly those of the smaller or readily movable type for use in distributing houses.

Distributing houses which are the supply depots for the telephone industry must keep numerous reels of various sizes of cable on hand for distribution to various areas. Frequently the cable orders are for the lengths of cable less than that disposed on full reels and in many instances, smaller or partially filled reels are utilized for shipping these desired lengths to the areas where they are needed. To make it possible to do this, an apparatus is necessary to close or re-lag the cable reels upon which the ordered lengths of cable are wound. The crowded space of the cable storing areas will not accommodate the conventional large lagging machines employed for initially lagging the reels and for this reason the need arose for a compact apparatus adapted for use with cable reels of various sizes.

The object of the invention is a compact efficient and highly practical reel lagging apparatus.

With this and other objects in view, the invention comprises a frame supporting rollers driven to rotate reels of various sizes while lags and metal tapes are positioned about the peripheries of the reels singly.

In the present embodiment of the invention, guiding units for the metal tapes are adapted to be positioned relative to drive rollers for the reels to direct the tapes into the respective grooves of lags of different lengths for reels of different sizes.

Other objects and advantages will be apparent from the following detailed description when considered in conjunction with the accompanying drawings, wherein:

Fig. 1 is a front elevational view of the apparatus;

Fig. 2 is a side elevational view of the apparatus illustrating the lagging operation in progress;

Fig. 3 is a fragmentary sectional view taken along the line 3—3 of Fig. 1;

Fig. 4 is a fragmentary sectional view taken along the line 4—4 of Fig. 1;

Fig. 5 is an isometric view of a lagged reel;

Figure 6:
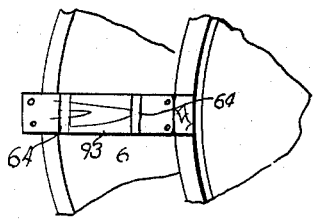
Fig. 6 is a fragmentary isometric view of a reel showing the mounting of the first lag thereon.
Figure 7:
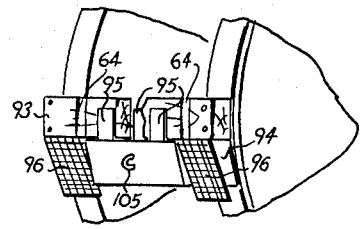
Fig. 7 is a fragmentary isometric view of a reel showing the attachment of the starting element to the first lag.
Figure 8:
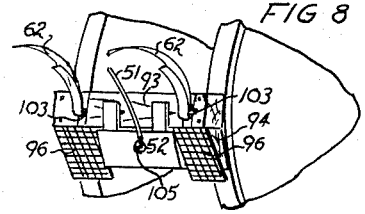
Fig. 8 is a fragmentary isometric view of a reel showing the cable attached to the starting element and the metal tapes stapled to the starting lag.
Figure 9:
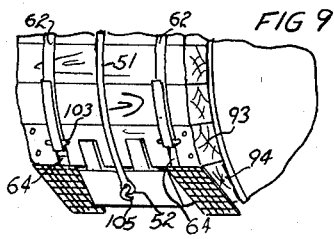
Fig. 9 is a continuation of the illustration of Fig. 8 with successive lags being added during operation of the apparatus.

The lagging or re-lag apparatus includes a main frame 20 which may be mounted at any suitable position on the floor. The frame has vertical members 21, supporting bearings 22 and 23 for shafts 24 and 25. The shaft 25 has H-shaped arms 26 rotatably supported at their upper ends upon shaft 25 while their lower ends rotatably support spindles 27 shown only in Fig. 2. The spindles 27 have narrow drive rollers 28 mounted on their inner ends and wide drive rollers 29 mounted on the portions of the spindles between the lower lags of the H-shaped arms 26. In the inner hollow or channel portions of each arm there is disposed a sprocket and chain connection 30 with the shaft 25 and the spindles 27 so that when the shaft 25 is rotated, the rollers 28 and 29 on the spindles 27 will be rotated clockwise (Fig. 2). A motor 32 driving a speed reducing unit 33 having a sprocket and chain connection 34 with the shaft 25 provides the power means for driving the rollers 28 and 29. In the present instance, the rollers 28 and 29 are provided with suitable friction means such as rubber tire outer surfaces with lateral grooves 35 to assure frictional contact with the reels to be lagged.

Each H-shaped arm 26 is provided with a pressure unit 38, shown in detail in Fig. 2, and including a cylinder 39 pivoted at 40 and housing a spring 41 against which a piston 42 is forced through linkage with the arm. The linkage includes a bell crank lever 43 pivoted at 44 with one end connected at 45 to the piston 42 and the other end connected at 46 to a link 47 pivotally connected to its respective arm 26. This mechanism assures positive driving connection between the drive rollers 28—29 and the reels when the reels are moved forcibly into engagement therewith.

The shaft 24 has a drum 50 mounted near the center thereof for a cable 51, the inner end of which is fixed to the drum while the outer end is secured to a snap hook 52. Smaller lengths 53 of cable have their lower ends fixed at 54 to the lower portion of the frame 20 while their upper ends are connected to a ring 55 engaging a hook 56 on the frame until needed during the final portion of the lagging operation.

Figure 14:
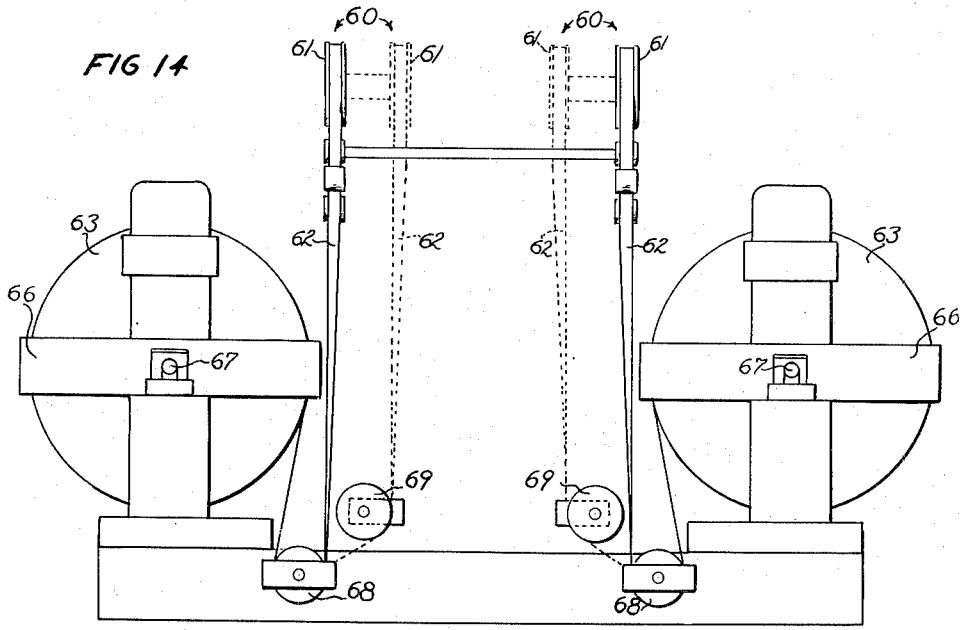
Fig. 14 is an isometric view of the steel tape supplies and associated guiding means therefor.

Guiding units 60 for the metal tapes are positioned upon each side of the drum 50 varied distances depending upon the sizes of cable reels to be lagged by the apparatus. The units 60 include grooved wheels 61 to receive metal tapes 62 from their supplies 63 and direct them to grooves 64 in lags 65. The supplies 63 of metal tape are supported in holders 66 for rotation on spindles 67, the holders being mounted on the frame 20 in any suitable manner (not shown). Pairs of guide rollers 68 and 69 are rotatably mounted in the position shown in Fig. 14 for selective use depending upon the size of reel to be lagged. In the solid line illustration of Fig. 14, the tape guiding units 60 are shown in their outermost positions for the larger and wider reels where only the guide rollers 66 will be used. The broken line portions illustrate the positions of the units and the grooved wheels 61 on the shaft 24 for the smaller or narrow reels when both sets of guide rollers 68 and 69 are employed as illustrated in Fig. 14.

The units 60 for guiding the tapes are shown more in detail in Figs. 3 and 4 including brackets 70 having forked upper ends 71 to straddle the shaft 24 and notched at 72 for mounting on a supporting bar 73 through the aid of suitable means such as a clamp 74. A rockable shaft 76 is supported by the brackets 70 of the units 60 and is actuable or rocked into desired positions by a hand lever 77. Pairs of levers 78 are fixed at their upper ends to the shaft 76 and carry spindles 79 at their lower ends for connections with links 80. The lower or free ends of the links 80 carry spindles 81 for free running rollers 82 maintained in alignment with free running rollers 83 on the shaft 24 by the spindles 81 being limited in their movements in elongate apertures 84. Brake type rollers 85, that is, rollers provided with a suitable brake drag means 85' are mounted on the spindles 79 to cooperate with their respective rollers 82 and 83 to apply predetermined variable tension in the tapes 62. During rocking motion of the shaft 76 by the hand lever 77, the brake rollers 85 move toward or away from the rollers 82 and 83 to increase or lessen the effect of the braking rollers on the tapes and thereby vary the tension on each tape.

Figure 15:
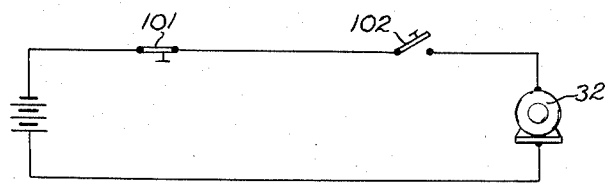
Fig. 15 is a schematic wiring diagram of the electrical circuit for the apparatus.

Considering now the operation of the lagging apparatus, the first step which must be taken, after the reel 90 is supported by the forked arms 91 of the conventional truck so that the reel may rotate about the supporting rod 92, is the nailing of a starting lag 93 to the rim of each head of the reel. Although the reel shown in the present embodiment of the invention is composed of metal, it is provided with suitable nail holes (not shown) for securing the initial lag 93 thereto. A starting element 94, including substantially U-shaped spring-like clips 95 for removable attachment to the underside of the initial lag 93, has friction plates 96 mounted at angles near the ends thereof for engagement with the drive rollers 28—29 to assure their riding upon the initial lag when starting the machine. Although only one starting element 94 is shown, it should be understood that similar starting elements of various lengths are provided for reels of different sizes. Attention is also directed to a hand wheel 97 mounted on the adjacent end of the shaft 24 and under the control of a ratchet 98 and pawl 99. The pawl 99 includes a projection 100 adapted when disposed in engagement with the ratchet 98 to actuate a switch 101 into open position. The switch 101 is in a circuit for the motor 32 shown schematically in Fig. 15, and under the control also of a foot switch 102.

Figure 10:
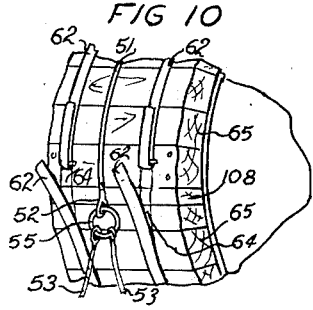
Fig. 10 is a fragmentary isometric view of the reel at the completion of the lagging prior to fastening the straps.
Figure 11:
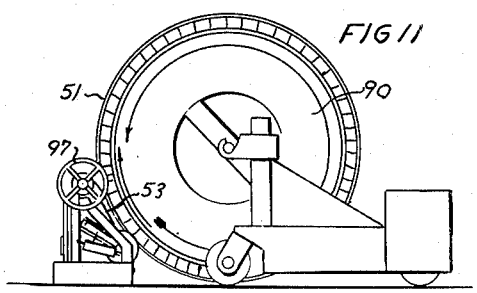
Fig. 11 is a side elevational view of the apparatus near the completion of a lagging operation illustrating the directions of pull on the cables holding the lags in place.
Figure 13:
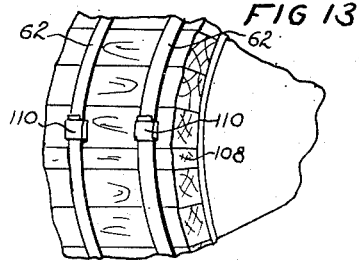
Fig. 13 is a fragmentary isometric view of the finished tapes of a lagged reel.
Figure 12:
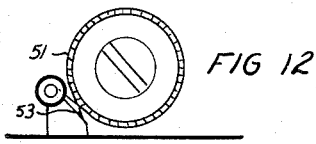
Fig. 12 is a schematic illustration of the cable tightening means.

After the initial lag 93 is nailed to the reel and the starting element 94 is temporarily secured to the undersurface of the initial lag, the tapes 62 are stapled at 103 to the starting lag allowing suitable lengths of their free ends to extend beyond the staples. In the present embodiment, only one staple is shown for each tape but it should be understood that any number desired may be employed. The starting element 94 is provided with an eyelet or ring-type member 105 at a convenient position near its center to which the snap hook 52 may be connected. At this time, the operator steps on the foot switch 102 closing the circuit to the motor 32 thus driving rollers 28—29. In the present illustration, the large reel is shown engaging the friction rollers 29 which will ride from the rims of the reel 90 up the ramp-like members 96 of the starting element 94 and onto the initial lag 93. The taut tapes 62 and the cable 51 provide a supporting means for the subsequent lags which are placed manually as indicated at 106 on the tapes and allowed to move into position where they will be held by the tapes and cable until substantially one complete revolution of the reel brings the starting element 94 and the initial lag 93 near the starting position. When this has been accomplished, the snap hook 52 is disconnected from the starting element 94. The starting element is removed from the initial lag and the snap hook is connected to the ring 55 of the cables 53 (Figs. 1 and 10). The remaining lags 65 are disposed in place, using, if necessary, narrower lags 108 to complete the closure of the reel. The pawl 99 is moved into engagement with the ratchet 98, opening the switch 101 to assure against starting of the motor 32 and at this time, the hand wheel 97 may be rotated to rotate the shaft 24 in a direction to wind the cable 51 on the drum 50 so that through the connection of the cable 51 with the cables 53 (as illustrated in Figs. 10, 11 and 12) the lags on the reel may be forced closely into engagement with the heads of the reel and held in position by the pawl until the tapes 62 are cut, drawn firmly about the lags in their respective grooves 64 thereof and secured by conventional binding elements 110. It should be understood that conventional tools employed for stretching and finally securing tapes of this kind together may be employed. After the ends of the tapes 62 are secured in place, the tension on the cable 51 may be released by rotating the hand wheel 97 with the shaft 24 of the drum 50 to free the pawl 99, after which the cable is made loose on the reel so that the snap hook may be released from the ring and removed from the lagged reel.

In the present illustration, with the larger reels engaging the drive wheels 29 and the units 60 in their outermost positions where they are held by suitable spacers 111 (Fig. 4), it should be understood that the removal of the spacers and the utilization thereof to bring the units 60 adjacent the drum 50, smaller reels may be moved into engagement with the drive wheels 28 to bring about efficient lagging of the small reels.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for lagging cable reels supported singly for rotation comprising drive rollers for the reels, a shaft, supports for the drive rollers swingably mounted on the shaft, means operatively connecting the rollers to the shaft, means to drive the shaft, and means operatively connected to the supports to force the rollers into frictional driving engagement with the reel to rotate the reel.

2. Apparatus for lagging reels of various widths comprising driven pairs of rollers spaced to selectively engage and rotate reels of different widths singly, a pair of supplies of metal tapes to be secured temporally to starting lags of the reels of different widths singly, guide units for the tapes adjustable relative to the supplies to direct the tapes to the reels of different widths, sets of rollers in each unit for guiding the tapes in tortuous paths for engagement with the rollers, one roller in each set being a brake roller and the remaining free to rotate, and means to vary the relative positions of the rollers in the sets to vary the tortuous paths of the tapes to create varied tensions therein.

3. Apparatus for lagging reels of various sizes comprising driven pairs of rollers to selectively rotate reels of different sizes singly, a pair of supplies of metal tapes to be secured temporally to starting lags of the reels of different sizes singly, guide units for the tapes adjustable relative to the supplies to direct the tapes to the reels of different sizes, sets of rollers in each unit for guiding the tapes in tortuous paths for engagement with the rollers, means to create brake drags on certain of the rollers to create predetermined tensions in the tapes, and means to simultaneously vary the relative positions of the rollers in each unit to vary the tensions on the tapes.

4. Apparatus for lagging reels supported singly for rotation and having starting lags secured to the rims thereof comprising driven rollers to engage the rims of a reel and rotate the reel, a starting element adapted for removable attachment to the starting lag and having ramp-like portions whereby the rollers may ride from the rims of the reel onto the starting lag and on other lags positioned successively adjacent the rims of the reel, a cable drum, a main cable wound thereon and having a hook mounted on a free end thereof, means mounted on the starting element to hold the lags in close engagement with the rims of the reel, an auxiliary cable with one end fixed and the other end adapted for attachment to the hook of the main cable when removed from the starting element to cooperate with the main cable to surround the reel.

5. Apparatus for lagging reels supported singly for rotation and having starting lags secured to the rims thereof comprising driven rollers to engage the rims of a reel and rotate the reel, a starting element adapted for removable attachment to the starting lag and having ramp-like portions whereby the rollers may ride from the rims of the reel onto the starting lag and on other lags positioned successively adjacent the rims of the reel, a cable drum, a main cable wound thereon and having a hook mounted on a free end thereof, means mounted on the starting element to hold the lags in close engagement with the rims of the reel, an auxiliary cable with one end fixed and the other end adapted for attachment to the hook of the main cable when removed from the starting element to cooperate with the main cable to surround the reel, means to rotate the drum when the starting element is removed and the remaining space is filled with lags to tighten the cables firmly about the lags on the reel.

6. Apparatus for lagging reels supported singly for rotation and having starting lags secured to the rims thereof comprising driven rollers to engage the rims of a reel and rotate the reel, a starting element adapted for removable attachment to the starting lag and having ramp-like portions whereby the rollers may ride from the rims of the reel onto the starting lag and on other lags positioned successively adjacent the rims of the reel, a cable drum, a main cable wound thereon and having a hook mounted on a free end thereof, means mounted on the starting element to hold the lags in close engagement with the rims of the reel, an auxiliary cable with one end fixed and the other end adapted for attachment to the hook of the main cable when removed from the starting element to cooperate with the main cable to surround the reel, a rotatable shaft having the drum fixedly mounted thereon, means to rotate the shaft and drum when the starting element is removed and the remaining space is filled with lags to tighten the cables firmly about the lags on the reel, a ratchet wheel mounted on the shaft, and a pawl movable into holding position in engagement with the ratchet wheel to hold the shaft and drum against rotation in one direction.

7. Apparatus for lagging reels supported singly for rotation and having starting lags secured to the rims thereof comprising driven rollers to engage the rims of a reel and rotate the reel, a starting element adapted for removable attachment to the starting lag and having ramp-like portions whereby the rollers may ride from the rims of the reel onto the starting lag and on other lags positioned successively adjacent the rims of the reel, a cable drum, a main cable wound thereon and having a hook mounted on a free end thereof, means mounted on the starting element to hold the lags in close engagement with the rims of the reel, an auxiliary cable with one end fixed and the other end adapted for attachment to the hook of the main cable when removed from the starting element to cooperate with the main cable to surround the reel, a rotatable shaft having the drum fixedly mounted thereon, means to rotate the shaft and drum when the starting element is removed and the remaining space is filled with lags to tighten the cables firmly about the lags on the reel, a ratchet wheel mounted on the shaft, a pawl movable into holding position in engagement with the ratchet wheel to hold the shaft and drum against rotation in one direction, an electric motor to drive the rollers, a normally open foot switch in a circuit with the motor, and a normally closed switch in the circuit actuable into open position by movement of the pawl into its holding position.

References Cited in the file of this patent

UNITED STATES PATENTS

| | | |
|---|---|---|
| 1,717,834 | Bureau | June 18, 1929 |
| 1,883,011 | Shewmon et al. | Oct. 18, 1932 |
| 2,678,668 | Bureau et al. | May 18, 1954 |